(12) United States Patent (10) Patent No.: US 8,166,398 B2
Wang et al. (45) Date of Patent: Apr. 24, 2012

(54) METHOD AND SYSTEM FOR DYNAMICALLY DISPLAYING A CONTROL BAR OF A MULTIMEDIA PLAYER

(75) Inventors: Kang-Yu Wang, Taipei (TW); Hong-Dian Chen, Taichung (TW)

(73) Assignee: Cyberlink Corp., Shindian, Taipei (TW)

( * ) Notice: Subject to any disclaimer, the term of this patent is extended or adjusted under 35 U.S.C. 154(b) by 767 days.

(21) Appl. No.: 12/260,160

(22) Filed: Oct. 29, 2008

(65) Prior Publication Data

US 2010/0107102 A1 Apr. 29, 2010

(51) Int. Cl.
*G06F 3/00* (2006.01)
(52) U.S. Cl. ......................................... 715/719; 715/790
(58) Field of Classification Search .................. 715/719, 715/810, 790
See application file for complete search history.

(56) References Cited

U.S. PATENT DOCUMENTS

| | | | |
|---|---|---|---|
| 6,857,105 B1 * | 2/2005 | Fox et al. ...................... | 715/825 |
| 2002/0040474 A1 * | 4/2002 | Ohkita ............................. | 725/37 |
| 2003/0081931 A1 | 5/2003 | Nanba | |
| 2004/0130576 A1 * | 7/2004 | Fujita et al. .................... | 345/781 |
| 2005/0184968 A1 * | 8/2005 | Uchida et al. .................. | 345/173 |
| 2007/0121012 A1 * | 5/2007 | Hida et al. ..................... | 348/589 |
| 2007/0189737 A1 * | 8/2007 | Chaudhri et al. ............. | 386/125 |
| 2008/0195951 A1 * | 8/2008 | Oshiro et al. .................. | 715/735 |

FOREIGN PATENT DOCUMENTS

JP 2008122507 A * 5/2008

* cited by examiner

*Primary Examiner* — Omar Abdul-Ali
(74) *Attorney, Agent, or Firm* — Thomas, Kayden, Horstemeyer & Risley, LLP

(57) ABSTRACT

The present invention relates generally to a method for dynamically displaying a control bar of a multimedia player, wherein one subjective thereof is to prevent overlap occurred to the menu image provided by a multimedia source. The method is preferably used for a digital versatile disc with high storage capacity, for example, the Blu-ray disc. According to the embodiment of the present invention, the method includes a first step of retrieving an Interactive Graphic (IG) stream from a disc, in which the IG stream defines an interactive graphic to be displayed. The method next goes to detect a trigger event of displaying a control bar in response to a user's operation. Further, an available region of the screen and a displaying mode are determined after analyzing the IG stream. Finally, the control bar, as the displaying mode describes, is show on the screen.

23 Claims, 12 Drawing Sheets

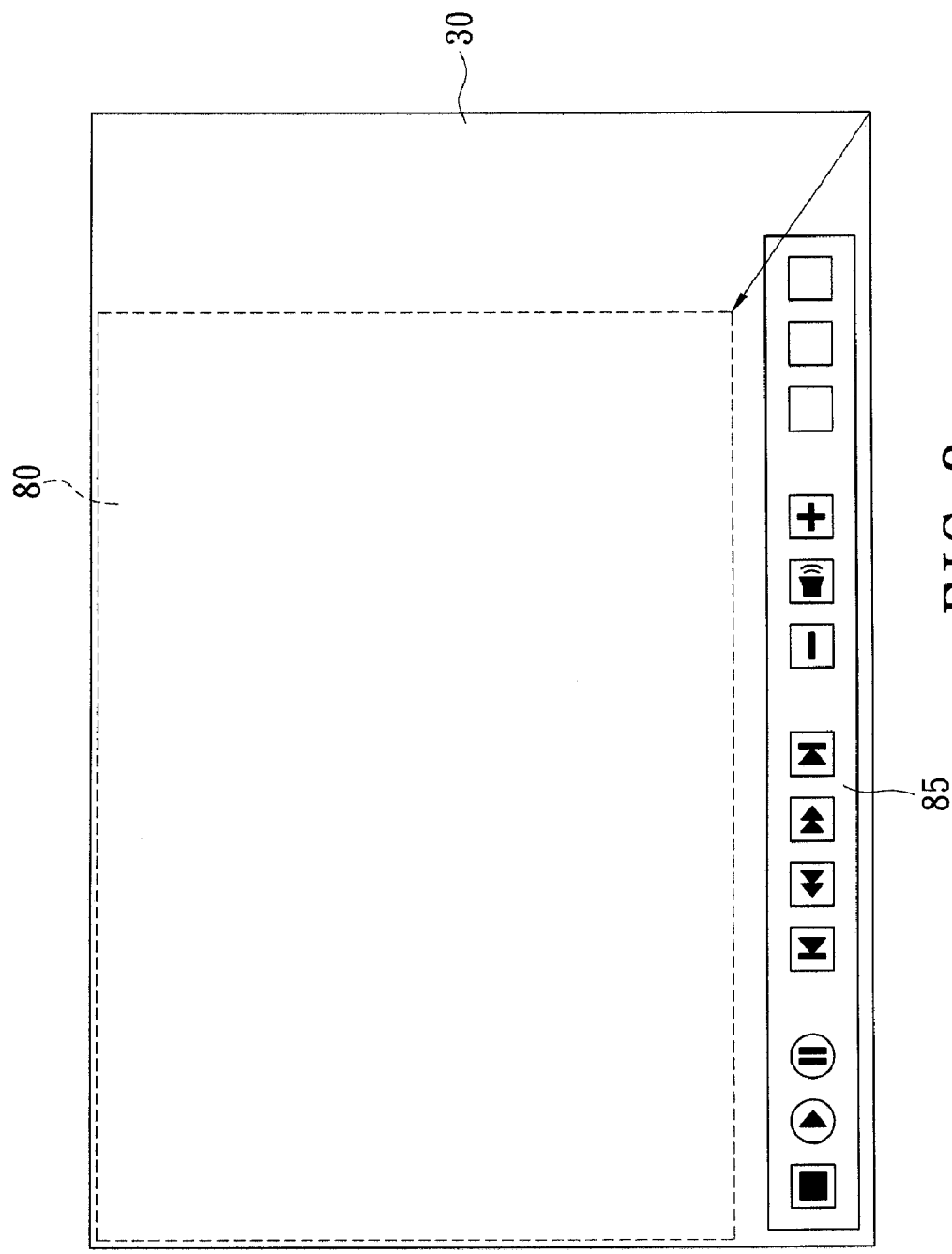

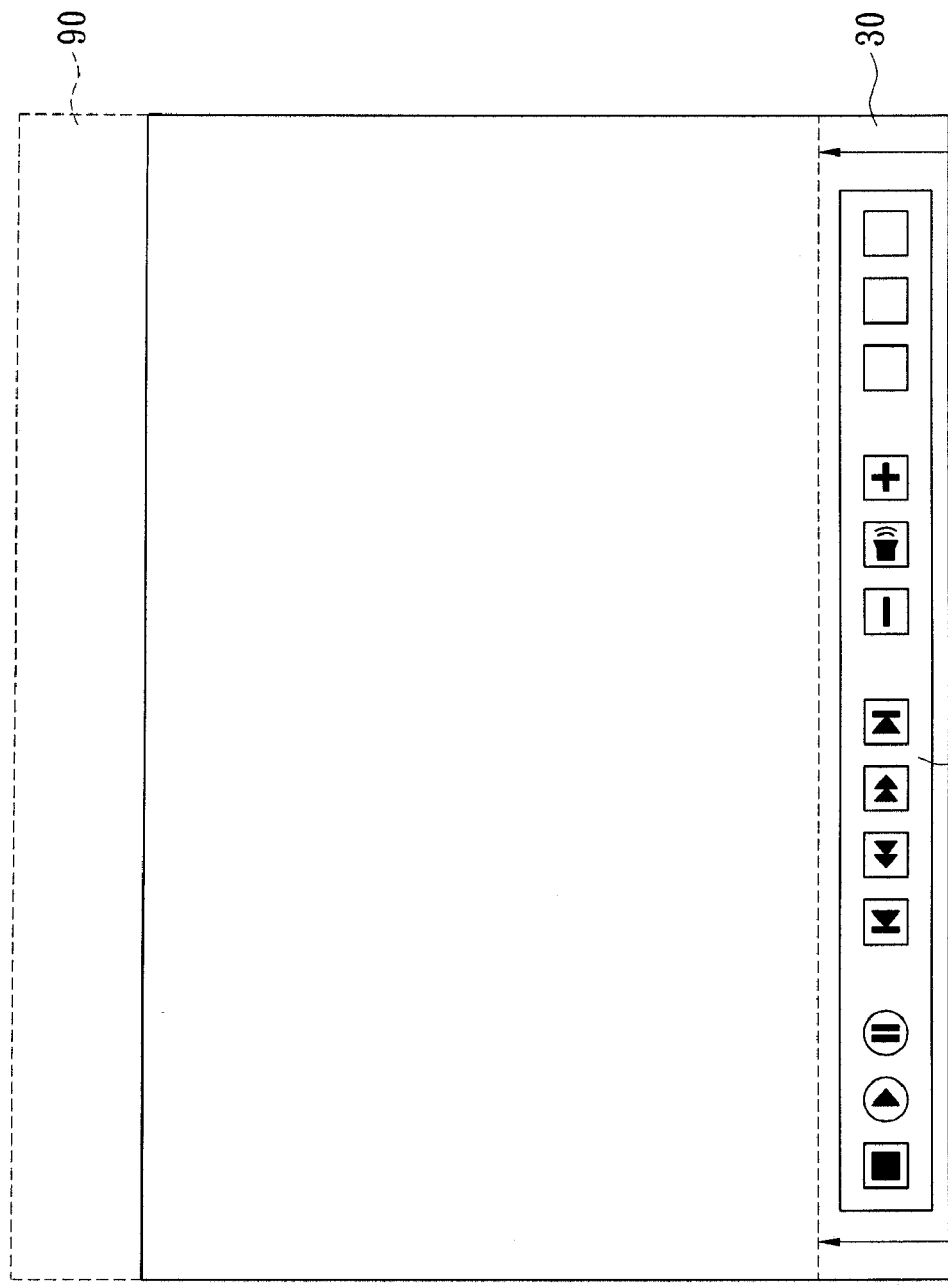

METHOD AND SYSTEM FOR DYNAMICALLY DISPLAYING A CONTROL BAR OF A MULTIMEDIA PLAYER

BACKGROUND OF THE INVENTION

1. Field of the Invention

The present invention relates generally to a method and system for dynamically displaying a control bar of a multimedia player, and more particularly to a scheme for dynamically adjusting the position of the control bar shown on a screen, in order to prevent overlap occurred to the menu image provided by a multimedia source.

2. Description of Related Art

With the development of audio-video entertainment environment, people are increasingly having higher requirements for watching high-resolution video, especially from the optical storage products such as DVD (digital versatile disc) and Blu-ray Disc—the next generation optical storage.

In general, both DVD and Blu-ray Disc are versatile optical storage media that provide many functions in addition to the multimedia content. Currently, the content stored in DVD having high capacity storage offers users a menu system in accompany with some functions—including some options of playback, sections to be played, pronounced languages, subtitles to be shown on the screen, and some other sub-features. Therefore, the users may be able to select the various options through an interactive user interface using a remote control manner.

In practice, when the mentioned versatile optical storage media is inserted into a multimedia player, such as a DVD player, a personal computer, a home media center, a portable video player or the similar devices, and being played, a disc menu associated with the above mentioned menu system will be shown on a screen of the player. That is the disc menu provided by the content of the multimedia stored in the discs. Simultaneously, the multimedia player itself may also provide a control bar with some other options for users to make selection. That is, the software or firmware installed in the multimedia player may provide other functions in addition to the menu system provided by the multimedia content.

Generally, when a video DVD is inserted into a DVD player installed in the computer system, the DVD player will read the video DVD immediately and show a first menu the screen after some initializing steps. The first menu usually provides some selective options such as play, sections, languages, subtitles, bonuses and the like. Moreover, the multimedia player may also provide some functions shown on the screen for the user to have the additional options.

The user uses a pointing device, such as a mouse, to move the pointer over the option of the first menu in order to trigger it. However, the movement of the pointer may also trigger the multimedia player to show its options associated with the functions on the screen. Therefore, on the screen, the later shown pattern including the options provided by the multimedia player will overlap the previous shown pattern having the selections made by the first menu.

Referring to FIG. 1 showing a screen shot with a general situation from a DVD video, where a control bar 15 provided by the multimedia player overlaps the background pattern (11, 12) provided by the disc content. Usually, when the multimedia content contained in the disc is reproduced by a multimedia player, the disc menu with several selective options will be shown on an area 11 of the screen 10 in the beginning, and sometimes other accompanying images will be shown on another area 12 further. At the moment, the control bar 15 may be triggered and shown on the screen 10 responsive to the user's operation.

Preferably, the shown disc menu and the accompanying background patterns (11, 12) are provided by the multimedia content, and the control bar 15 is provided by the multimedia player. Thus the user may not use some functions of the selective options shown in the background pattern when they are overlapped by the foreground control bar 15.

Some prior approaches were disclosed to solve the forgoing problem as foreground image provided by the multimedia player overlapping the current background pattern during reproduction of the video. The similar situation occurs to an on-screen-display (OSD) in response to operation by a user during reproduction of the video. Please refer to U.S. Patent Application Publication No. 2003/0081931, which provided a scheme to avoid the overlapping.

The OSD is an image superimposed on a screen picture to display information such as volume, channel, and time made by the player. The OSD will be shown that is conventionally overlaid on the main menu originally displayed on the screen according to the user's operation. Reference is made to FIG. 2 showing an example in which the menu items are highlighted and the OSD are displayed on the screen.

As shown in FIG. 2, wherein, a screen 20 shows a main menu with items (201, 202, 203, 204) having highlighted "1. SELECT CHAPTER", "2. SELECT CAPTION", etc. According to the disclosure, the positions of the highlighted items are analyzed firstly, then the OSD 1 is attempted to display on the screen but shifted to a new position as the shown OSD 2. Therefore, the OSD 2 does not overlap the menu items 201, 202, 203 and 204 after the estimation of the positions of the highlighted areas.

Furthermore, in contrast, the method of retrieving and analyzing the sub-picture data from data of DVD video of the prior art requires high graphics processing ability, so it makes the resource exhausted by the analyzing manner.

SUMMARY OF THE INVENTION

Even though some prior approaches were allegedly provided to solve the above-mentioned problems, the present invention particularly provides a method and system for dynamically displaying a control bar in order to avoid a mix of the background pattern and the foreground control bar. In present, the scheme therefor provides an advanced approach to solve the problem of overlapping menus.

According to the embodiment of the present invention, the method for dynamically displaying the control bar at least includes the steps of retrieving an Interactive Graphic stream from a disc, detecting a trigger event of displaying the control bar in response to an operation made by the user, analyzing the Interactive Graphic stream to determine an available region of the screen, and determining a displaying mode according to the available region. The Interactive Graphic stream defines at least one interactive graphic to be displayed on a video window of the screen. Consequently, the control bar is displayed on the screen as the displaying mode describes in order to avoid overlaying the interactive graphic.

The claimed system for dynamically displaying the control bar is also provided. The system at least includes a retrieving module, a detecting module, an analyzing module, a determining module, and a displaying module. The retrieving module used for retrieving an Interactive Graphic stream from a disc, a detecting module used for detecting a trigger event of displaying the control bar, and the analyzing module used for analyzing the Interactive Graphic stream to determine an available region. Further, the determining module is included to determine a displaying mode. The displaying module is finally used to display the control bar according to the displaying mode without overlaying the interactive graphic.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 8 is a schematic diagram illustrating a resizing action of screen made by the embodiment according to the present invention;

FIGS. 9A and 9B are the schematic diagrams illustrating a shifting action of screen made by the embodiment according to the present invention;

DETAILED DESCRIPTION OF PREFERRED EMBODIMENTS

The present invention is illustrated with embodiments and attached drawings. However, the invention is not intended to be limited thereby.

According to an embodiment, the method for dynamically displaying the control bar of the multimedia player is applied to the versatile optical storage media such as DVD and Blu-ray Disc. Since those versatile optical storage media may have high enough capacity storage to store the multimedia content—including the superb audio/video content and the accompanying data. Particularly, the present invention is to aim at the application for the new generation optical disc, the Blu-ray Disc, which may not only provide high-definition video and data storage, but also some other versatile functions such as the network connection. Further, the claimed multimedia player may be implemented by software or firmware embedded in a player machine.

When the optical disc storage media is loaded into a multimedia player, such as a hardware player, a personal computer, a home media center, a portable video player or the similar devices having a multimedia player installed, the player's screen will display a first image after an initialization procedure. This first image is usually provided by the multimedia content itself, and can be a disc menu with some selective options (PLAY, SECTIONS, LANGUAGE, SUBTITLE, etc.) and some relevant images such as TITLE, LOGO or the advertisement of the video. The mentioned selective options PLAY, SECTIONS, LANGUAGE, SUBTITLE and the like of the disc menu are provided for the user to decide what next he can do to the multimedia content—including immediately playing the content, selecting the section to be played, selecting a speaking language the people in video pronouncing, or selecting a language of the subtitle to be displayed on the screen. The other images such as TITLE of the video and its relevant pattern are also retrieved from the multimedia content.

Figure 1:
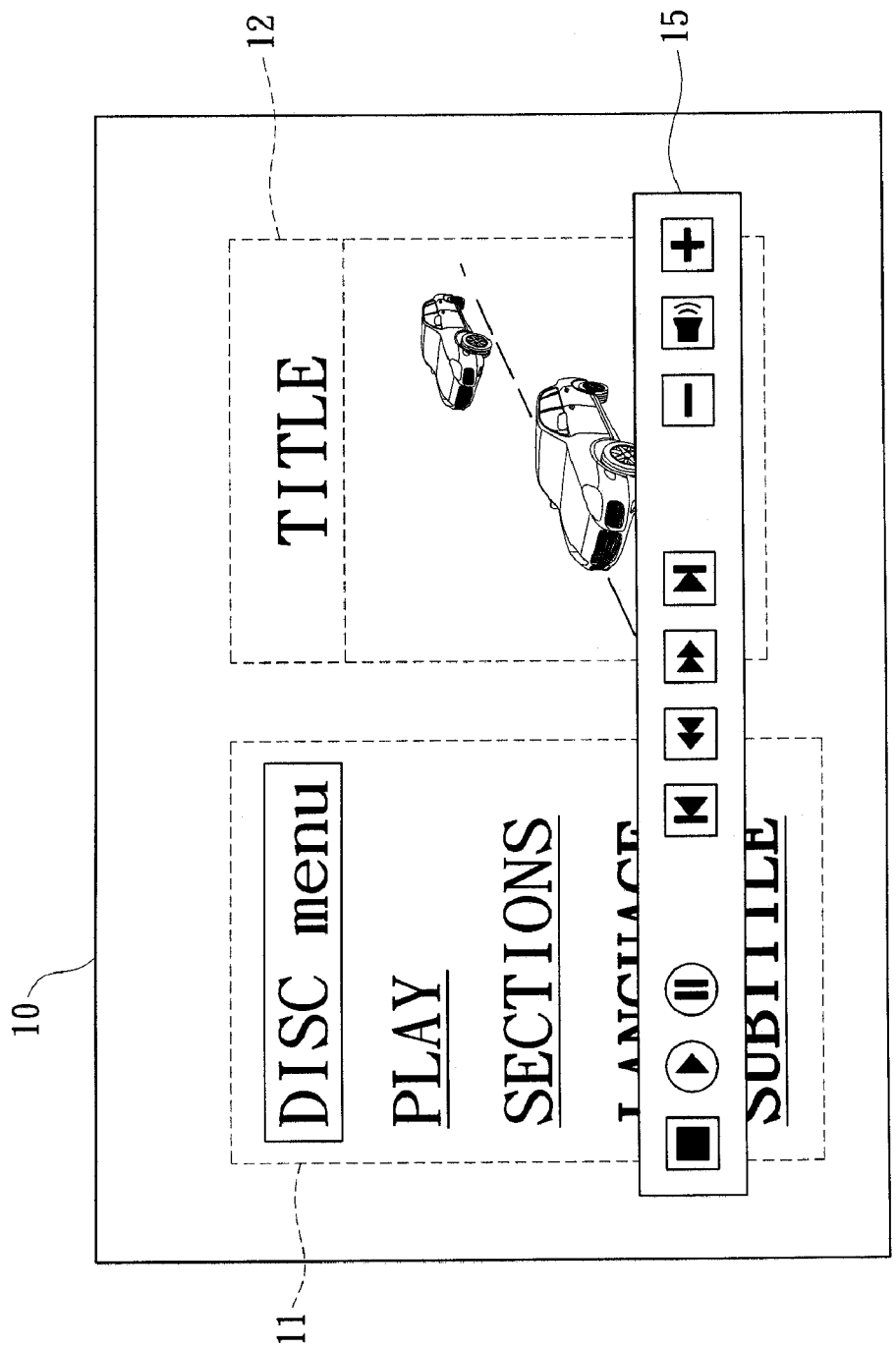
FIG. 1 is a schematic view of a screen shot with a general situation from a DVD video image.
Figure 2:
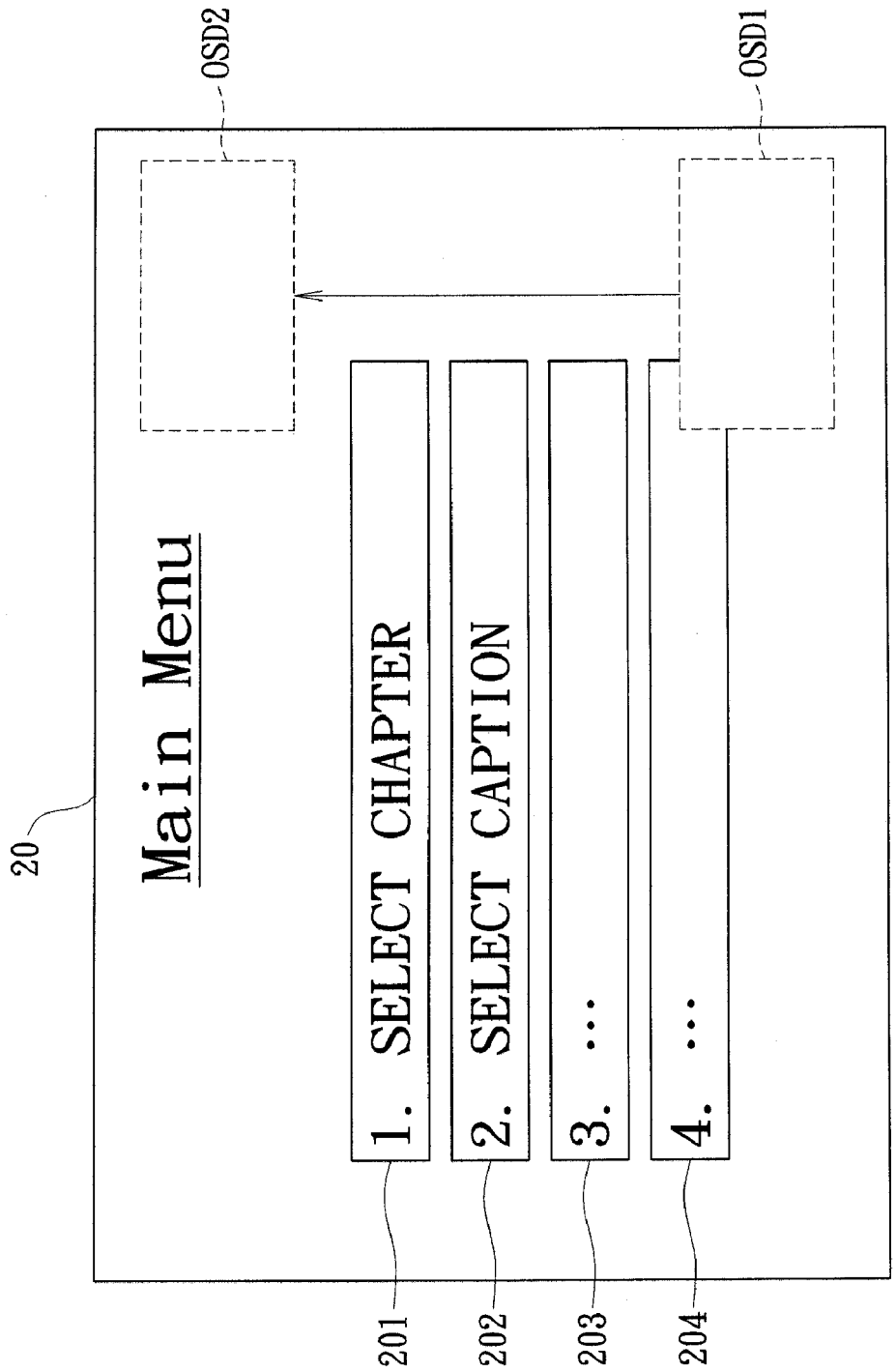
FIG. 2 shows an example in which the menu items are highlighted and the OSD are displayed on the screen.
Figure 3:
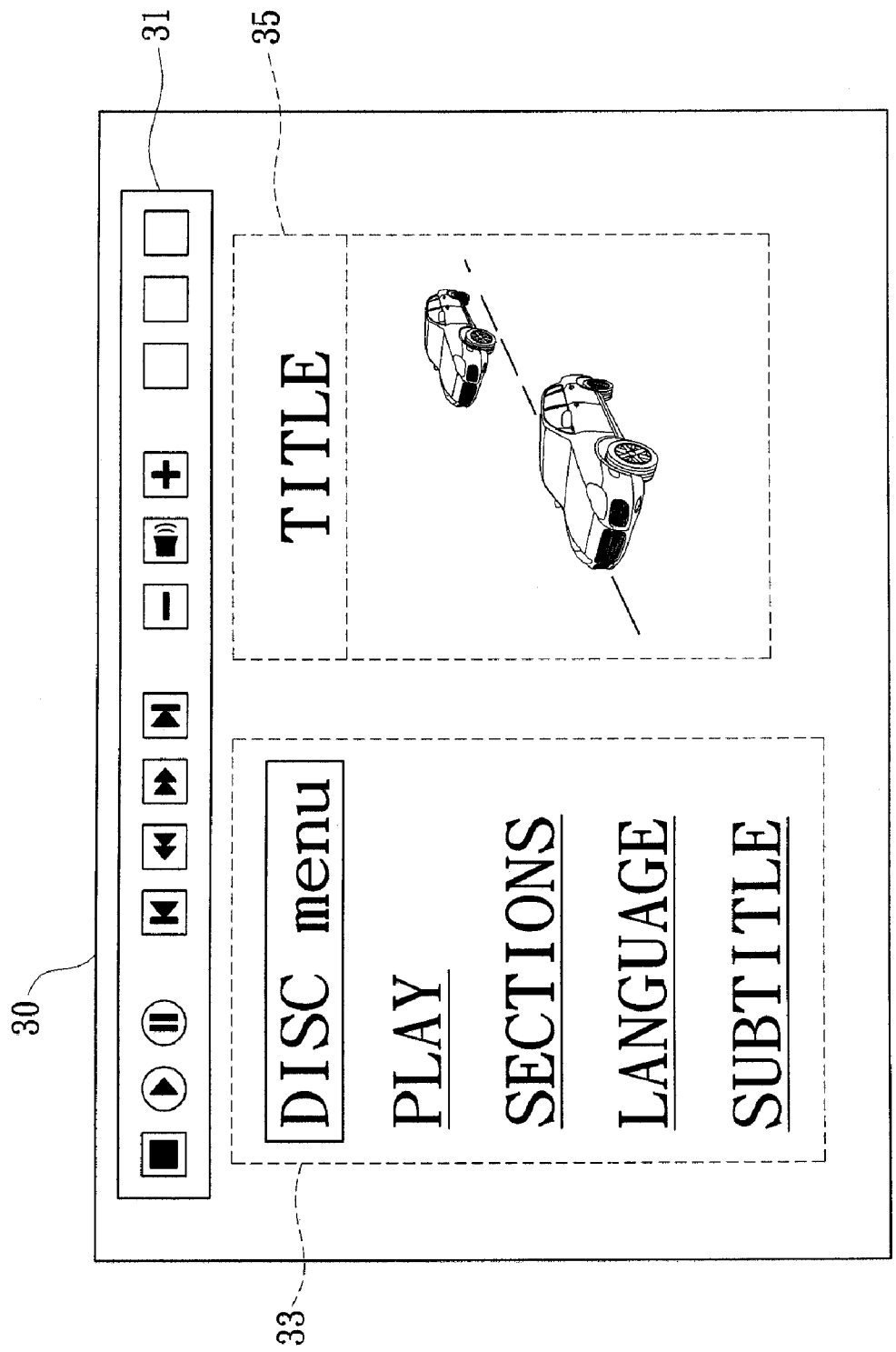
FIG. 3 is a view of a screen shot illustrating the areas occupied by the respective control bar, disc menu and other images.

Referring to FIG. 3 showing a schematic diagram of a screen shot illustrating the areas occupied by the respective control bar 31, disc menu 33 and other images (35) in accordance with the embodiment according to the present invention. If the user uses a computer mouse or remote control to make the selection from the selective options, a control bar 31 provided by the multimedia player can also be shown on the screen 30 under some situations. For example, when the user uses the computer mouse to move the pointer traveling on the screen for a constant time, the multimedia player will receive this event and generate a signal to trigger off the control bar 31. Usually, the trigger event is responsive to the operation made by the user's input through a graphic user interface, such as the mouse, keyboard, or any other remote controls. For preventing the overlaps of the background pattern and the foreground control bar, the method for dynamically displaying the control bar of the present embodiment will be activated simultaneously to determine what the proper way the control bar 31 is positioned before displaying.

The control bar 31 usually provides the functions that the disc menu doesn't have, such as the functions of the controlling of the visual reproduction, the controlling of the audio reproduction and other additional functions. For example, the control bar 31 provides the functions of stop/play/pause the video during playback, fast forward/backward play the video, jump to next/previous section of the video, and adjust the volume. According to the exemplary example shown in FIG. 3, the control bar 31 is displayed on the top side of the screen 30 since the disc menu 33 and images 35 are determined to position at the lower space by the claimed method.

In order to avoid the overlap between the background pattern showing the disc menu or other relative images and the foreground image showing the control bar, the method for dynamically displaying the control bar according to one embodiment of the present invention will refer to the information in an IG (Interactive Graphic) stream and define the edge of the disc menu or other images accordingly. After that, the method will judge what the proper position the control bar is positioned based on the determination of the background pattern.

The IG stream is one sort of the information as the data recorded in a disc besides the video stream. The data may include, but is not limited to, an audio, a presentation graphic (PG), an Interactive Graphic (IG) and a text subtitle. In which, the Interactive Graphic stream may either be provided from the main data (e.g., a main Interactive Graphic stream), which is recorded within the optical disc, or be provided from the sub data (e.g., an auxiliary Interactive Graphic stream), which is downloaded from an external source. In general, the described Interactive Graphic stream defines at least one interactive graphic to be displayed on a video window of the screen. Preferably, this interactive graphic is the defined region selectable to a user, such as the selectable menu button and selectable scenes (shown as an image or snapshot of video) to be played at the beginning page of video. The selectable region of interactive graphic may further provide some extensible functions, such as controllable game or other displayed areas operable by the user.

In particular, the concerned Interactive Graphic stream in accordance with the embodiment particularly has the information of the image shown on the screen, thereby the claimed method for dynamically displaying the control bar may determine the proper way to display the control bar. Since the Blu-ray Disc format supports a fully programmable platform for highly interactivity by means of a BD-J (Blu-ray Disc Java) technology, the users can experience the richer interactive functions beyond the conventional limited menu of video. For example, the interactions included in a Blu-ray Disc can include games, variant viewing effects, user interfaces, trailer download via network connection, more subtitle options, on-line shopping, more special features, and other innovative content besides the disc menu. Particularly, the memory of the Blu-ray Disc further includes the Interactive Graphic that allows the user to select options while viewing, or interacting with the provided content, wherein the Interactive Graphic stream has the information supplied from a Blu-ray Disc Java program.

Figure 4:
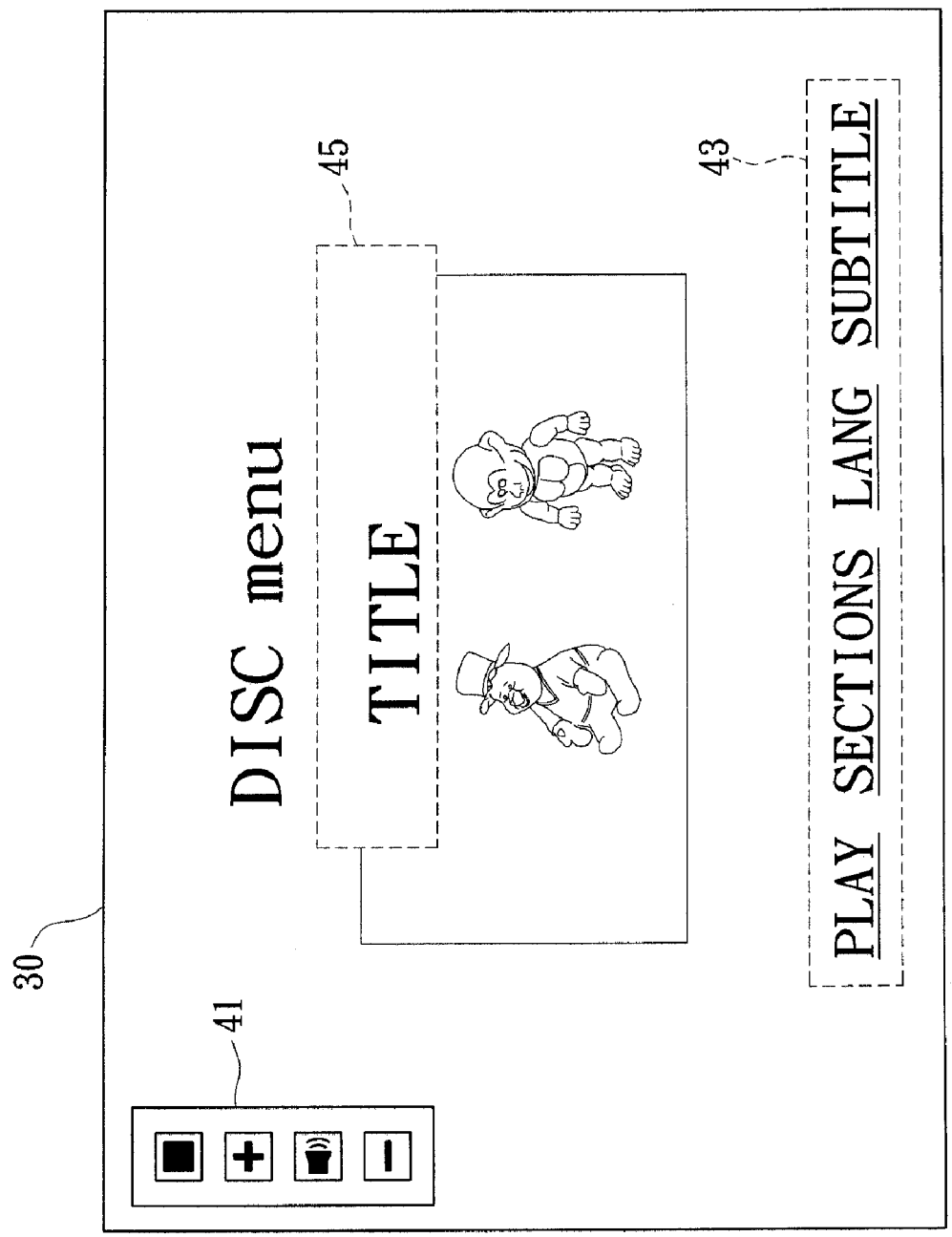
FIG. 4 is a view of a screen shot illustrating the areas indicating the background and foreground.

Referring to FIG. 4 showing a next displaying mode of a screen shot of the control bar, wherein the screen shot also illustrates several areas indicating the background and foreground on the video screen. According to the embodiment, a first page as shown in drawing having the information concerning the video is displayed after loading the disc. The disc menu with the selective options 43 and the some images 45 (video title and thematic image) therewith in the first page are preferably launched by the multimedia player. When the user uses a pointing device, such as a mouse or a touch pad, to move the pointer traveling on the screen for a certain distance or a period of time, the control bar 41 may be triggered.

Since the range of Interactive Graphic made by the Blu-ray Disc Java technology is too big to show the full-function control bar, the multimedia player may selectively show the options the user prefers. In detail, the multimedia player embodying the claimed method for dynamically displaying the control bar 41 will firstly refer to the mentioned IG stream and accordingly define the edge of the pattern occupied by the disc menu (43, 45). After that, a proper displaying mode is specified to show the control bar 41.

FIG. 4 is referred to show the control bar 41 only with some basic functions, for example, the audio adjustment functions are included. It is determined to display the control bar 41 by specifying a certain displaying mode in response to the condition of insufficient space to display the full-functional control bar. According to this exemplary example, the control bar 41 is displayed at the up-left corner as the proper position based on the determination of the background pattern.

Figure 5:
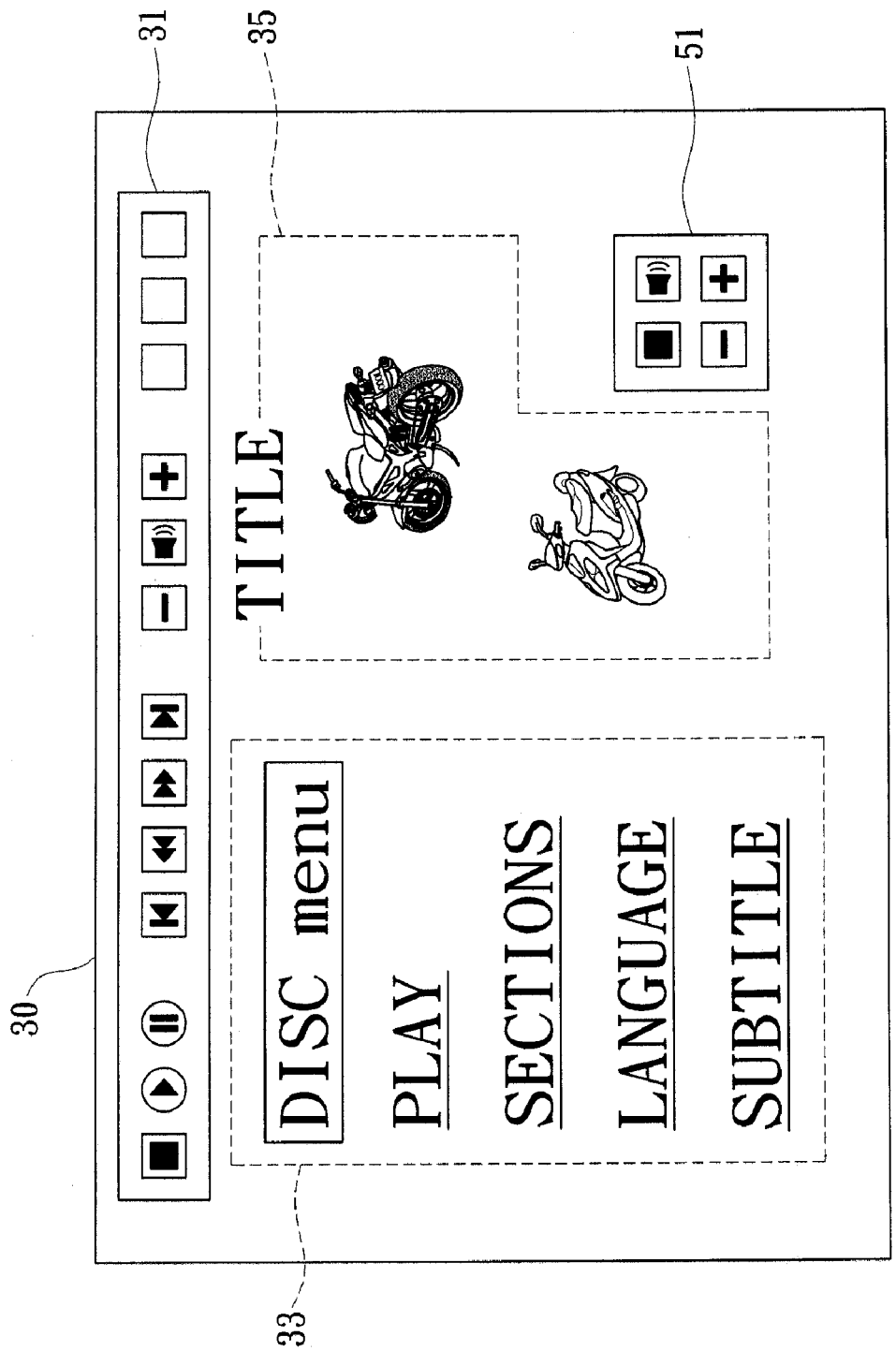
FIG. 5 is a view of a screen shot illustrating the areas indicating the background and foreground.

FIG. 5 further shows a schematic diagram of one embodiment made by the embodiment according to the present invention. This screen shot includes an area of disc menu 53 and the image 55 with the relative video title and the thematic image after loading the video disc. When the control bar 51 provided by the multimedia player is triggered by moving the pointer or other similar event, the multimedia player will refer to the IG stream and retrieve the information of those background images. Then the area indicating the background is defined. Simultaneously, a displaying mode can be specified to display the foreground control bar 51. According to current drawing, the control bar 51 with some audio adjustment buttons is positioned at a down-left side, and the position is particularly embedded in the background pattern. Where the displaying mode responsive to the available space can be introduced into one displaying mode listed in the lookup table.

It is noted that the position and the displaying mode for the control bar 41 may be determined according to a lookup table. The lookup table should take into consideration every condition of the background pattern occupied on the screen, and list every corresponding solution. The mentioned displaying mode may include the positions of the control bar, including up-left, up-right, down-left, and down-right and their directions (vertical or horizontal). The displaying mode may also include the functions listed on the control bar, such as the audio adjustment (volume up, volume down, play and stop), video progress (shown as a time line) and its control (fast/slow forward/backward, jump to previous/next section, play and stop), and other additional functions. The control bar displaying all functions provided by the multimedia player is regarded as the full-function, and the partial function control bar only display a part of the all functions.

Figure 6:
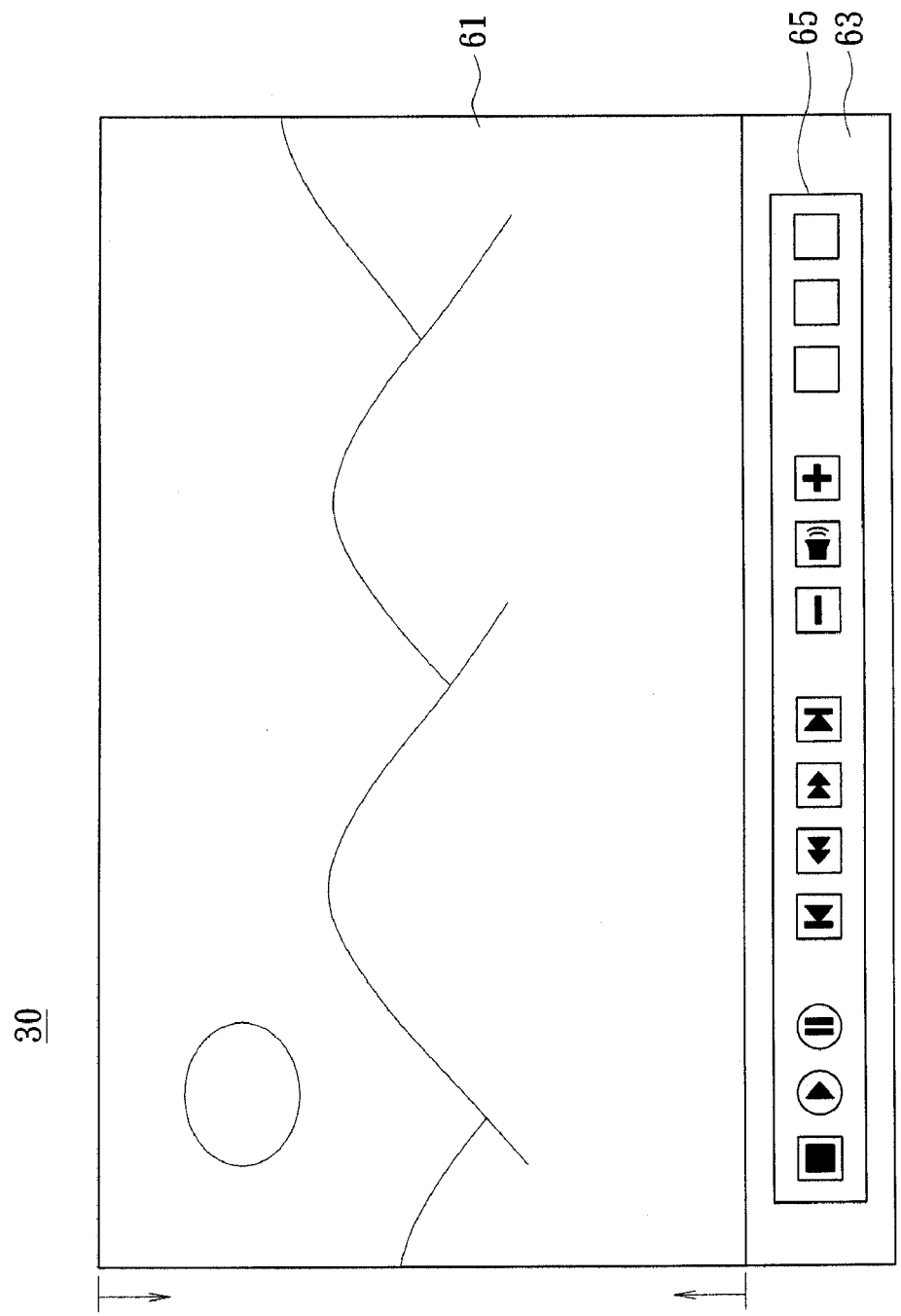
FIG. 6 is a view of a screen shot illustrating two portions of screen with deformed video image made by the embodiment according to the present invention.
Figure 7:
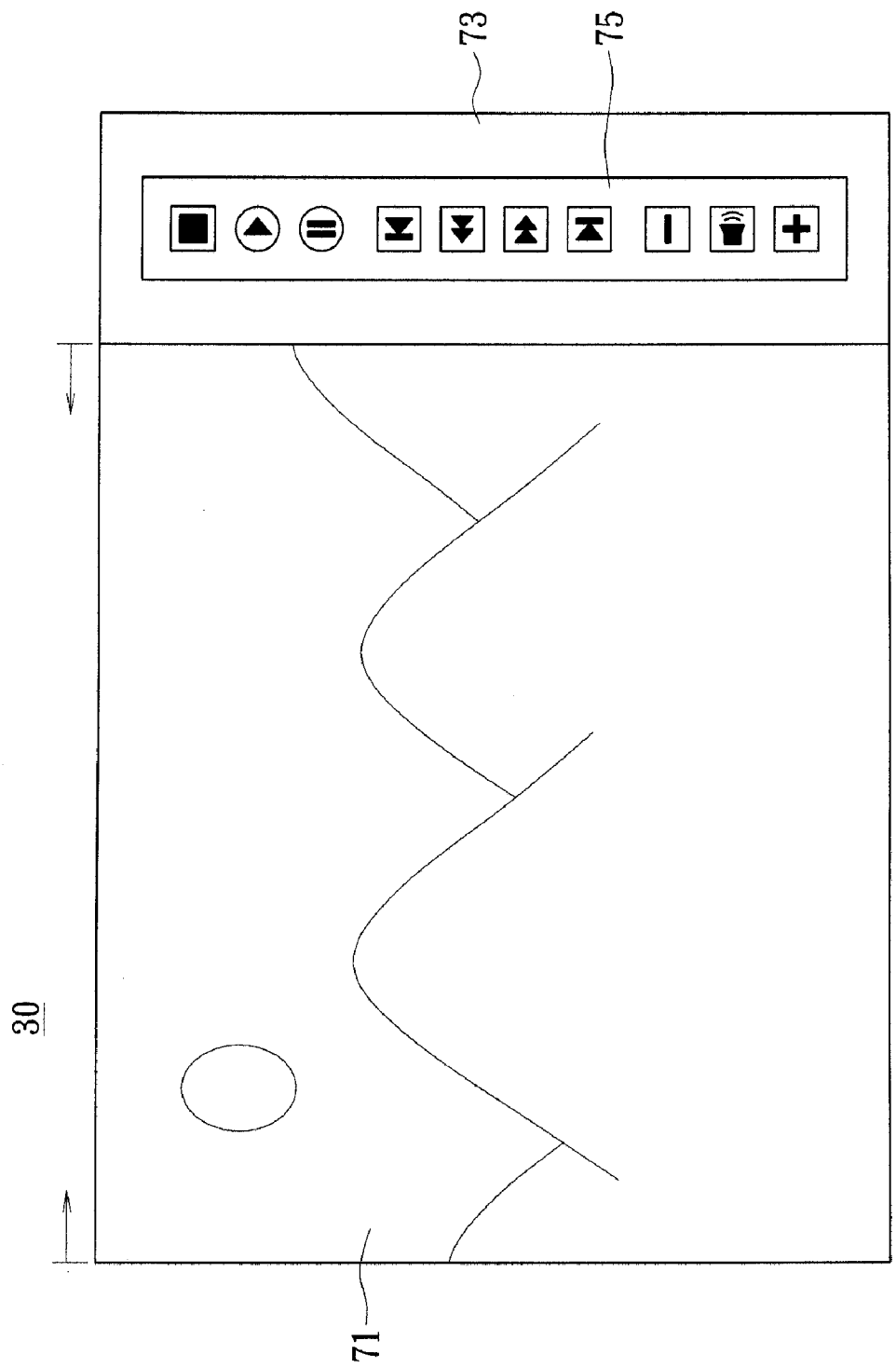
FIG. 7 is a view of a screen shot illustrating two portions of screen with deformed video image made by the embodiment according to the present invention.

Moreover, the claimed method for dynamically displaying the control bar provides some additional embodiments of the displaying modes, as shown in FIG. 6 and FIG. 7.

Reference is made to FIG. 6, which shows a schematic diagram of a screen shot illustrating two portions of the screen with a deformed video image made by the embodiment according to the present invention. Besides the moment to display the first page, the mentioned control bar may also be triggered during playing of a video. According to the drawing, the frame on screen 30 is separated into two portions, wherein the above portion 61 shows the broadcasting video and the below portion 63 shows the triggered control bar 65. When the control bar 65 is triggered by the user or other event during the playing of the video, the multimedia player refers to the IG stream for requiring the information of the video and determining which displaying mode is used to show the control bar 65.

In this case, the currently broadcasting video is deformed shown as the portion 61 by the multimedia player, as well as the control bar 65 is shown at the portion 63. Particularly, the multimedia player can be function as a graphic processing unit in charge of deforming the video image in playing. Therefore, the control bar 63 won't overlap the video.

FIG. 7 shows another schematic diagram of a screen shot illustrating two portions of screen with a deformed video made by the embodiment according to the present invention. The control bar 75 is positioned at a right-side portion 73 of the screen 30 after the determination of the displaying mode is made by the multimedia player. Therefore, the currently broadcasting video is deformed temporarily on the left-side portion 71 since the multimedia player has the function to deform a played video.

According to the embodiment, the mentioned displaying modes are preferably settled in advance and acknowledged by the multimedia player. In order to avoid overlap occurred to the background and foreground image under different conditions of the displayed content, the claimed method for dynamically displaying the control bar is provided. Specifically, one displaying mode for the control bar is determined by the multimedia player referring to the IG stream and defining the type of the background image.

FIG. 8 further shows a schematic diagram illustrating a resizing action of screen made by the embodiment according to the present invention. The event of triggering the control bar is detected in response to the operation made by the user. More particularly, the operation made by the user could be achieved by detecting the movement of the mouse or the other similar action and display the position of the cursor related to the detected action of mouse. After detecting the mouse's position, the method is performed to resize the video window in response to the position of the cursor. In this embodiment, the view window 80 is resized toward the opposite side or corner of the screen 30 because the cursor's position is identified on a side or a corner of the screen 30. Meanwhile, an available L-shape space for displaying the control bar 85 is left after resizing the view window 80. Similarly, the control bar 85 can be full-function, limited-function, or customized-function control bar.

In the embodiment, the above resized view window 80 may keep its original aspect ratio since it changes its area by a predetermined ratio, being deformed with different aspect ratios or being deformed different shape of the video window.

Figure 9B:
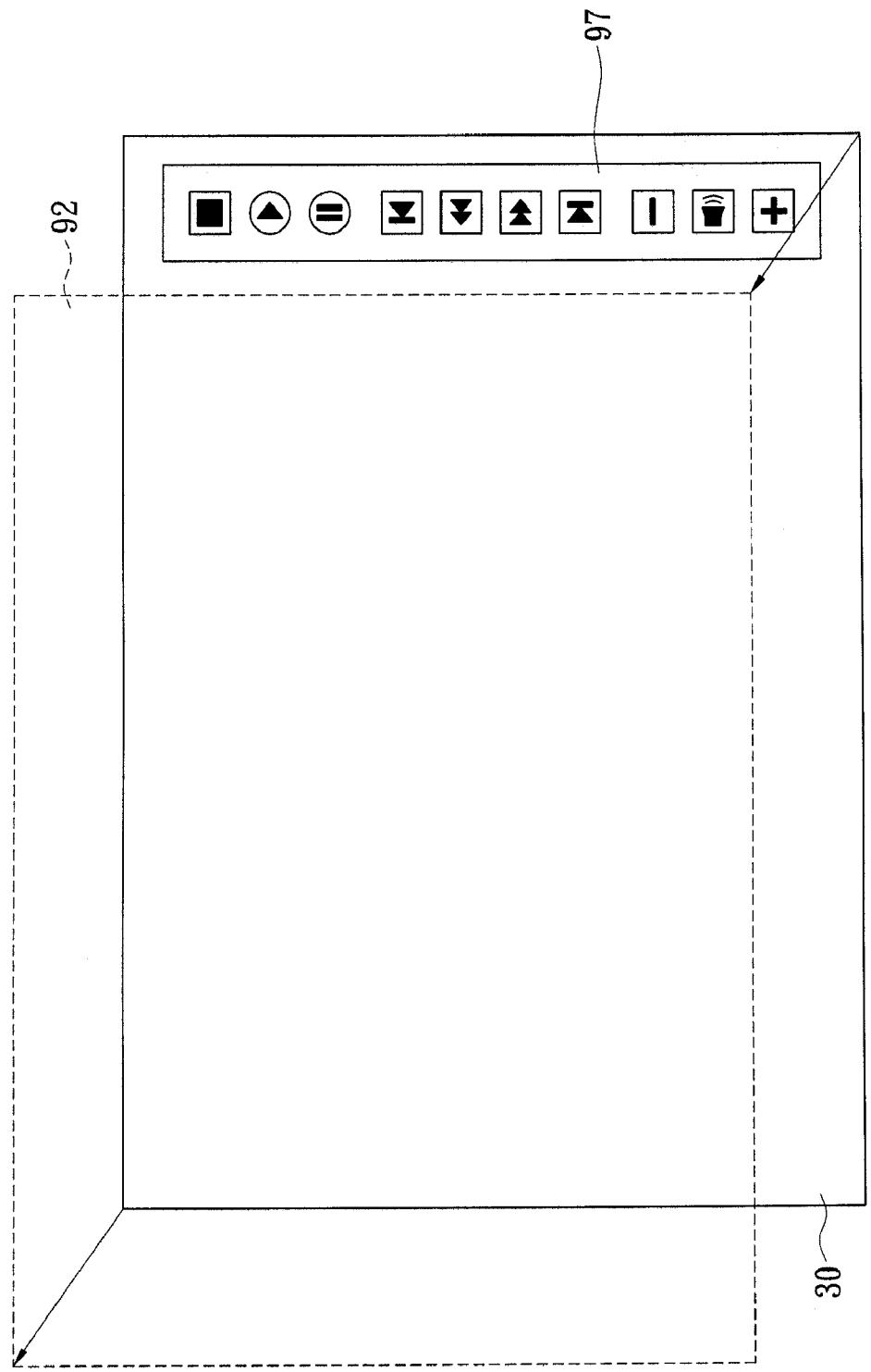

FIGS. 9A and 9B further show the schematic diagrams illustrating a shifting action of screen made by the embodiment according to the present invention. These two diagrams provide another scheme different from the described FIG. 8 since the respective view windows 90 and 92 are shifted without any change of the aspect ratio.

In FIG. 9A, after detecting the event of triggering the control bar and identifying the cursor's position, the view window 90 shifts straightforward to the side of the screen 30 opposite to the location of the cursor. Because the shifted direction is opposite relative to the location of the cursor, an available region for displaying the control bar 95 is obtained around the position of the cursor.

It's similar to FIG. 9A, the view window 92 shown in FIG. 9B shifts to the opposite corner of the screen 30 as the cursor is identified as positioning at one corner. Particularly, the view window 92 shifts without changing the aspect ratio, and an L-shape space in this example is left for displaying the control bar 97.

To sum up the above description, such the displaying conditions can be classified into several modes—including the space mode, the deform mode, the resize mode, and shift mode in general cases. Apparently, the mentioned deform mode, resize mode, or shift mode is introduced while a video is broadcasted, and the space mode is used while the disc menu or other still images are shown as a background. Under the deform mode, the foreground control bar may be positioned at the up side, down side, right side, or left side of the frame as the broadcasting video is deformed to position at an opposite side. At this moment, the control bar may be specified as one mode selected from several modes, including a full-function control bar, and limited/customized-function control bars. Under the space mode, the foreground control bar may be positioned at any available space where the background image is obviated. Similarly, the control bar can be shown as a full/limited/customized-function control bar under the space mode. Further, under resize or shift mode, the control bar may be positioned at one side in an available L-shape space opposite to the direction the view window resized or shifted to.

Figure 10:
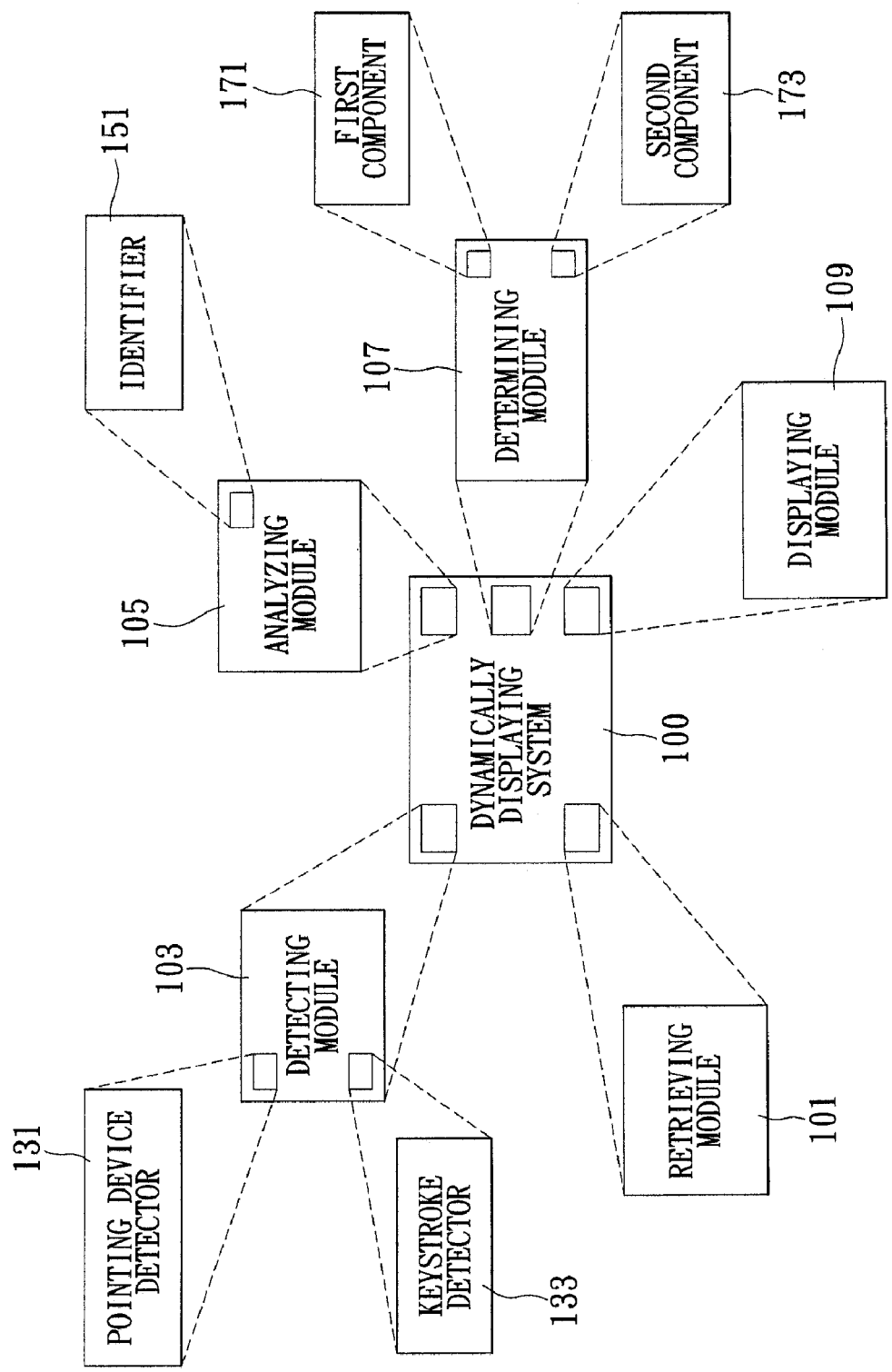
FIG. 10 shows a diagram of the system for dynamically displaying the control bar of the embodiment according to the present invention.

An embodiment of the invention further introduces a system for dynamically displaying the control bar for embodying the above-described method. FIG. 10 shows the block diagram illustrating the system. A dynamically displaying system 100 is shown in the center of the diagram, and it includes several modules—including a retrieving module 101, a detecting module 103, an analyzing module 105, a determining module 107, and a displaying module 109. What follows are the detailed illustrations regarding these modules.

The retrieving module 101 is configured to retrieve the Interactive Graphic stream from a disc. Since the Interactive Graphic stream defines the interactive graphic to be displayed on the view window (supporting full screen or non-full screen), the retrieved data from the IG stream is required to define the edge of the disc menu or other images on some pages. More particularly, this retrieving module may be made by a program routine for the multimedia player or embedded firmware for a multimedia player. Moreover, the interactive graphic is selectable region on the video window of the screen, such as menu button, selectable image/thumbnail/video, for example, the scenes to be selected, controllable game, and other displayed area operable by the user.

After the information of IG stream is retrieved, the detecting module 103 is standby to detect the trigger event of displaying the control bar. The trigger event is activated in response to an operation made by the user, such as the movement of the mouse, the click of the mouse, the sensed location of the touch pad, the sensed gesture of the touch pad, keyboard keystroke, or the instruction from a remote control, or any action from other possible input device. The detecting module 103 may be a software-implemented or firmware-embedded module, in which a software-implemented or firmware-embedded pointing device detector 131 is configured to detect the actions of a pointing device providing an input interface that allows the user to input spatial data for at least one of movement, click, gesture, and location. And a keystroke detector 133 is further incorporated to implement the detection, including the function to detect a keystroke of a keyboard or remote control.

Further, a software-implemented or firmware-embedded analyzing module 105 is incorporated. The analyzing module 105 is configured to analyze the Interactive Graphic stream to determine the available region of the screen. This available region is a region different from the interactive graphic occupied on the video window for positioning the control bar. In detail, an identifier 151 is further used to identify a property of the interactive graphic on the video window after the analysis. More, the property of the interactive graphic includes the predetermined appearance location, boundary, and occurrence time period. For example, the Interactive Graphic stream may be defined in BD-J of Blu-ray Disc, or similarly defined in codes of DVD or HD-DVD for displaying the menu on a frame.

Still further, a software-implemented or firmware-embedded determining module 107 is used for determining a displaying mode, such as the space mode, deform mode, resize mode, or shift mode, according to the available region. Every mode can be defined as at least two portions, that are the original view window in full screen display or non-full screen display and the dynamic view window after the control bar is triggered. Particularly, the two portions may be respectively implemented by a first component 171 and second component 173 made by program routine or embedded firmware.

More, a displaying module 109 in the dynamically displaying system 100 is used for displaying the control bar on the screen. The software-implemented or firmware-embedded displaying module 109 is made to decide a displaying mode and to display the control bar without overlaying the interactive graphic.

Figure 11:
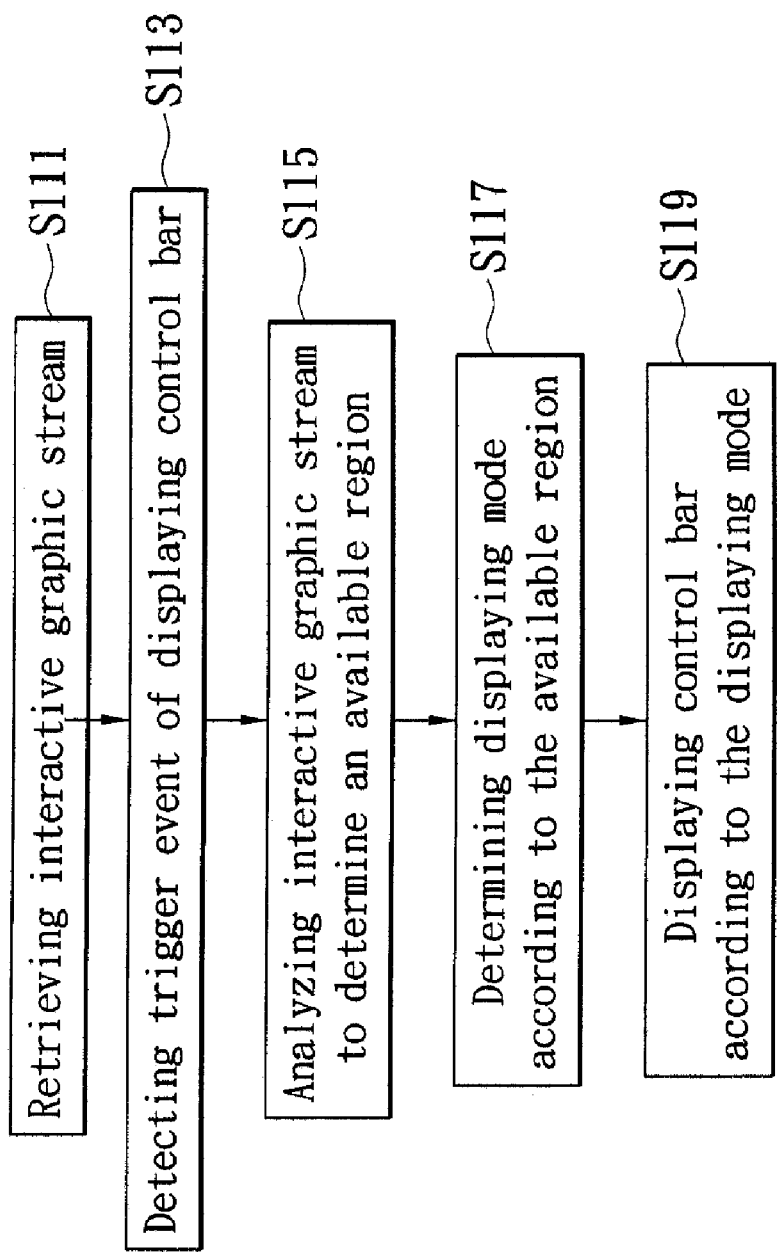
FIG. 11 shows a flow chart of the method of the embodiment according to the present invention.

In light of the above description of the claimed method and system may be used to prevent the overlap between the background pattern and the foreground image, a flow chart described in FIG. 11 is referred to implement the method for dynamically displaying the control bar of the multimedia player of the embodiment according to the present invention. Primarily, the Interactive Graphic stream is introduced to define the background pattern, including the first page, disc menu with the accompanying images and even the broadcasting video, and next a displaying mode is determined to display the control bar on the screen.

In the beginning, the video disc is loaded into a player, which is preferably played with a multimedia player, and a first page is shown on the screen after an initializing procedure. The first page usually contains a disc menu with several selective options for configuring video or user's preference. In general, the disc menu can be shown anytime as broadcasting the video after reading user's instruction. In the next-generation optical storage, such as the Blu-ray disc, the first page or the disc menu further provides options with additional functions. For example, a network connection can be used to retrieve data associated with the video to be broadcasted from Internet.

After loading the disc, in step S111, the method goes to retrieve an Interactive Graphic stream from the disc. Since the Interactive Graphic stream defines the interactive graphic that is shown as the mentioned first page or some images displayed on the view window, the retrieved data is used to define the edge of the images. Then the claimed method is performed as a control bar provided by the multimedia player is triggered to be displayed on the screen (step S113).

At the moment, if the first page or disc menu has already been displayed, or as the video has been played, the multimedia player refers to the information of an Interactive Graphic stream and analyzes the Interactive Graphic stream to determine an available region (Step S115). The information could be the foreground images and background pattern which are referred to depict the edge of the relevant images.

Next, according to the type of the available region, the method goes to determine a displaying mode of displaying the control bar (Step S117). According to the embodiment, several modes for displaying the control bar are preferably to take into consideration responsive to the determination of the background based on the IG information. For example, the control bar can be specified as a full-function, limited-function or customized-function control bar depending on where the control bar is positioned.

After that, the control bar is displayed on the screen according to the specified displaying mode made by the multimedia player (step S119).

In summation of the description above, the method for dynamically displaying the control bar provided by the multimedia player is disclosed for preventing the overlap between the background pattern and the later-shown foreground image. In particular, before the displaying of the control bar, the information retrieved from the Interactive Graphic stream is introduced to define the edge of the disc menu, or the accompanying images, or the type for background pattern. After that, the control bar is displayed without overlapping the background pattern.

While the invention has been described by means of a specification with accompanying drawings of specific embodiments, numerous modifications and variations could be made thereto by those skilled in the art without departing from the scope and spirit of the invention set forth in the claims.

What is claimed is:

1. A method for dynamically displaying a control bar of a multimedia player, comprising:
    retrieving an Interactive Graphic stream from a disc, wherein the Interactive Graphic stream defines at least one interactive graphic to be displayed on a video window of the screen and the interactive graphic is selectable to a user;
    detecting a trigger event of displaying the control bar in response to an operation made by the user;
    analyzing the Interactive Graphic stream to determine an available region of the screen, wherein the available region is different from the interactive graphic occupied on the video window;
    determining a displaying mode according to the available region, wherein the determining the displaying mode further comprises determining the control bar to be displayed on the screen with full functions or partial functions according to the available region of the screen; and
    displaying the control bar on the screen according to the displaying mode in order to avoid overlaying the interactive graphic.

2. The method of claim 1, wherein the disc is one of Blu-ray Disc, DVD, and HD-DVD.

3. The method of claim 1, wherein the detecting step further comprises detecting an action of a pointing device, wherein the action comprises a movement, a click, a sensed gesture, a sensed location, or a combination thereof.

4. The method of claim 3, wherein the pointing device provides an input interface that allows the user to input spatial data.

5. The method of claim 1, wherein the detecting step further comprises detecting a keystroke of a keyboard or a remote control.

6. The method of claim 1, wherein the analyzing step further comprises identifying a property of the interactive graphic on the video window, and the property of the interactive graphic includes at least one of predetermined appearance location, corresponding boundaries, and occurrence time/period.

7. The method of claim 1, wherein the determining the displaying mode further comprises determining a location of the control bar to be displayed on the screen according to the available region.

8. The method of claim 1, wherein the partial functions of the control bar are a part of the full functions determined by the user.

9. The method of claim 1, wherein the determining the displaying mode further comprises determining an action of the video window.

10. The method of claim 9, wherein the action of the video window is resizing, deforming or shifting.

11. The method of claim 10, further comprising displaying the video window with the corresponding action.

12. The method of claim 1, further comprising:
    determining that the interactive graphic defined by the Interactive Graphic stream has changed;
    analyzing the Interactive Graphic stream to determine a different available region of the screen, wherein the different available region is different from the interactive graphic occupied on the video window and is different from the available region;
    determining a different displaying mode according to the different available region; and
    displaying the control bar on the screen according to the different displaying mode in order to avoid overlaying the interactive graphic.

13. A system for dynamically displaying a control bar of a multimedia player on a screen, comprising:
    a retrieving module configured to retrieve an Interactive Graphic stream from a disc, the Interactive Graphic stream defining at least one interactive graphic to be displayed on a video window of the screen and selectable by a user;
    a detecting module configured to detect a trigger event of displaying the control bar in response to an operation of the user;

an analyzing module configured to analyze the Interactive Graphic stream to determine an available region of the screen, wherein the available region is a region different from the interactive graphic occupied on the video window;

a determining module configured to determine a displaying mode according to the available region, wherein the determining module further configured to determine the control bar to be displayed on the screen with full functions or partial functions according to the available region of the screen; and a displaying module configured to display the control bar on the screen according to the displaying mode without overlaying the interactive graphic.

14. The system of claim 13, wherein the disc comprises one of Blu-ray Disc, DVD, and HD-DVD.

15. The system of claim 13, wherein the detecting module further comprises a pointing device detector configured to detect an action of a pointing device, wherein the action comprising a movement, a click, a sensed gesture, a sensed location and the combination thereof.

16. The system of claim 15, wherein the pointing device comprises an input interface that allows the user to input spatial data.

17. The system of claim 13, wherein the detecting module further comprises a keystroke detector configured to detect a keystroke of a keyboard or remote control.

18. The system of claim 13, wherein the analyzing module further configured to identify a property of the interactive graphic on the video window, and the property of the interactive graphic includes at least one of predetermined appearance location, corresponding boundaries, and occurrence time/period.

19. The system of claim 13, wherein the determining module further configured to determine a location of the control bar to be displayed on the screen according to the available region.

20. The system of claim 13, wherein the partial functions of the control bar are a part of the full functions determined by the user.

21. The system of claim 13, wherein the determining module further configured to determine an action of the video window.

22. The system of claim 21, wherein the action of the video window is resizing, deforming or shifting.

23. The system of claim 13, wherein the displaying module further configured to display the video window with the corresponding action.

* * * * *